United States Patent
Huelz et al.

(10) Patent No.: US 11,691,534 B2
(45) Date of Patent: Jul. 4, 2023

(54) CHARGING SYSTEM FOR QUICKLY AND SECURELY CHARGING ELECTRIC VEHICLES

(71) Applicant: Bayerische Motoren Werke Aktiengesellschaft, Munich (DE)

(72) Inventors: Martina Huelz, Munich (DE); Andreas Jochem, Munich (DE); Isabel Povoa, Munich (DE); Henning von See, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 590 days.

(21) Appl. No.: 16/751,294

(22) Filed: Jan. 24, 2020

(65) Prior Publication Data
US 2020/0156499 A1 May 21, 2020

Related U.S. Application Data

(63) Continuation of application No. PCT/EP2018/069517, filed on Jul. 18, 2018.

(30) Foreign Application Priority Data

Jul. 27, 2017 (DE) ...................... 10 2017 212 904.2

(51) Int. Cl.
*B60L 53/66* (2019.01)
*B60L 53/30* (2019.01)

(52) U.S. Cl.
CPC ........... *B60L 53/665* (2019.02); *B60L 53/305* (2019.02)

(58) Field of Classification Search
CPC .............................. B60L 53/665; B60L 53/305

USPC .......................................................... 320/109
See application file for complete search history.

(56) References Cited

U.S. PATENT DOCUMENTS

| 8,421,592 B1 | 4/2013 | Gunasekara et al. |
| 2017/0140408 A1 | 5/2017 | Wuehler |
| 2020/0076198 A1* | 3/2020 | Beckmann ............. G05B 15/02 |

(Continued)

FOREIGN PATENT DOCUMENTS

WO    WO 2017/092817 A1    6/2017

OTHER PUBLICATIONS

International Search Report (PCT/ISA/210) issued in PCT Application No. PCT/EP2018/069517 dated Oct. 18, 2018 with English translation (four (4) pages).

(Continued)

*Primary Examiner* — Richard V Muralidar
(74) *Attorney, Agent, or Firm* — Crowell & Moring LLP

(57) ABSTRACT

A charging system for quickly and securely performing charging operations of electric vehicles includes at least one electric vehicle, at least one power source, and at least one smart contract. The at least one electric vehicle includes at least one electrical energy store. The at least one power source is configured to charge the energy store. The charging parameters for a charging operation of the electrical energy store are negotiable between the electric vehicle and the power source. The negotiation of the charging parameters comprises determining a charging requirement of the electrical energy store by means of the electric vehicle. The charging operation of the electrical energy store is performable with the aid of a smart contract.

6 Claims, 5 Drawing Sheets

(56) References Cited

U.S. PATENT DOCUMENTS

2020/0148072 A1* 5/2020 Ashley ............... G06Q 20/102

OTHER PUBLICATIONS

German-language Written Opinion (PCT/ISA/237) issued in PCT Application No. PCT/EP2018/069517 dated Oct. 18, 2018 (eight (8) pages).
German-language Search Report issued in counterpart German Application No. 102017212904.2 dated May 8, 2018 with partial English translation (11 pages).
Blockgeeks "Smart Contracts: The Blockchain Technology That Will Replace Lawyers", A Beginner's Guide to Smart Contracts, Jun. 23, 2017, https://blockgeeks.com/guides/smart-contracts, (nine (9) pages).
"Hundreds of Charging Stations for Electric Cars Blockchenized with Ethereum in Germany", Ethereum News, May 2, 2017, https://www.ccn.com/hundreds-charging-stations-electric-cars-blockchenized-ethereum-germany/ (three (3) pages).
Wellisch et al., "Vehicle-to-Grid AC Charging Station: An Approach for Smart Charging Development", IFAC-Papers Online, 2015, pp. 005-060, vol. 48-4, (six (6) pages).

* cited by examiner

CHARGING SYSTEM FOR QUICKLY AND SECURELY CHARGING ELECTRIC VEHICLES

CROSS REFERENCE TO RELATED APPLICATIONS

This application is a continuation of PCT International Application No. PCT/EP2018/069517, filed Jul. 18, 2018, which claims priority under 35 U.S.C. § 119 from German Patent Application No. 10 2017 212 904.2, filed Jul. 27, 2017, the entire disclosures of which are herein expressly incorporated by reference.

BACKGROUND AND SUMMARY OF THE INVENTION

The embodiments of the present invention relate to a charging system for quickly and securely charging electric vehicles or at least partially electrically operated vehicles.

Electric vehicles, for example at least partially electrically operated bicycles and scooters, but, in particular, also purely electrically operated electric automobiles (battery electric vehicle, BEV) and electric automobiles having an at least supportive electric drive, are known. Micro, mild and full hybrid vehicles which implement parallel, power-split or serial hybrid drive concepts are known. In particular, in addition to purely electrical drive concepts, plug-in hybrids (plug-in hybrid electric vehicle, PHEV) are known, in particular. Vehicles having such drive concepts are called electric vehicles below. Electric vehicles are distinguished by the fact that they comprise at least one electrical energy store. The at least one electrical energy store of electric vehicles can be charged via a power source.

Users of electric vehicles (for example their owners and/or drivers) are confronted with a heterogeneous infrastructure of power sources, for example charging stations, which has been unsatisfactory for a long time. In particular, power sources are often provided by a multiplicity of different providers, wherein each provider considerably complicates different procedures with regard to performing and paying for a charging operation of the electrical energy store. In addition, the use of the power source generally requires previous registration of the user with the provider, with the result that it is not possible to spontaneously charge the electrical energy store using an unknown provider (for example in a strange city). It may be the case that the user of an electric vehicle already has a multiplicity of payment cards and/or heterogeneous payment accounts for different providers. A separate payment method is implemented for virtually every provider. This may mean that, before each operation of charging the electrical energy store of the electric automobile at a charging station belonging to a new provider, the user can carry out charging only with excessive effort (previous registration, etc.).

One object of the embodiments of the invention is to avoid the disadvantages mentioned above and to provide a solution which makes it possible to charge electric vehicles in a fast, uncomplicated and secure manner.

This and other objects are achieved, according to the invention, by a charging system for quickly and securely performing charging operations of electric vehicles, that includes at least one electric vehicle comprising at least one electrical energy store, at least one power source which can be used to charge the energy store, and at least one smart contract, wherein the charging parameters for a charging operation of the electrical energy store can be negotiated between the electric vehicle and the power source; and the charging operation of the electrical energy store can be performed with the aid of a smart contract.

The electric vehicle may be, in particular, an electric automobile or a plug-in hybrid or else any other at least partially electrically operated vehicle, for example an at least partially electrically operated truck or bus, an electrically operated bicycle or an electrically operated scooter. The electric vehicle is also called a vehicle below. The electric vehicle may be an autonomously driving electric vehicle.

The power source which can be used to charge the energy store of the vehicle may be any desired power source, for example a charging pole or charging station, a conventional household socket, household wall charging stations or wall boxes, a further electric vehicle, the electrical energy store of which is charged but the electrical energy is not required (for example owner is not in the country), a streetlight, a photovoltaic store, an inductive charging station or a charging pad, etc.

The electric vehicle and the power source can each comprise a blockchain module, with which they can participate in a blockchain. For example, a blockchain node can be executed on the blockchain module. In another example, a light client for participating in the blockchain can be executed on the blockchain module. In particular, the blockchain module can comprise a runtime environment for executing a blockchain node.

The term "blockchain" as used herein means a distributed database, the integrity of which is protected by means of cryptographic concatenation. The entries (for example transactions) in the blockchain are grouped into blocks. The blocks are linked to one another in chronological order with the aid of a cryptographic signature. The blockchain is a distributed system in which network subscribers provide hardware resources in order to provide contents and/or services of the blockchain. A network comprising a plurality of independent computers or network nodes which communicate and synchronize with one another is therefore produced. For example, the data relating to the blockchain can be stored in each network node in this case. The network nodes communicate directly (peer-2-peer, P2P). As a result of the use of the cryptographic signatures, the blockchain enables transactions which are performed between the subscribers without a central entity. For example, cryptocurrencies, for example Bitcoin and Ethereum, can therefore be created and managed via a blockchain, that is to say a decentralized P2P computer network, by virtue of all transactions in the cryptocurrency being able to be created and verified within the network. The term "blockchain" also comprises all further developments of the current blockchain technology and further common and future P2P databases with cryptographic protection which are suitable for implementing cryptocurrency systems. The term "blockchain" comprises all systems which comprise or implement distributed ledger technology, that is to say a consensus of replicated, shared and synchronized digital data which are stored in geographically distributed databases.

A smart contract is a computer-based transaction protocol which implements conditions of a contract. The smart contract is an executable computer program which can make decisions when particular conditions are satisfied. For example, external data which cause a particular action via predefined implemented contract rules (the conditions) can be used as an input. In a blockchain, a smart contract can be stored as executable script at a particular address of the blockchain. If the conditions stipulated in the smart contract occur, a transaction is transmitted to this particular address of the blockchain. The smart contract checks the conditions and can cause or perform the particular action if the check is successful. In one example, a smart contract can also be certified by a digital signature from a particular provider in order to increase the trustworthiness even further.

This advantageously provides a charging system which can perform charging operations of electrical energy stores in a simple manner using machine-to-machine (M2M) communication, in which case the need for prior complicated registrations with the various providers in order to perform the charging and payment operations is dispensed with.

The electric vehicle, the power source and the smart contract each preferably comprise at least one cyber wallet for negotiating the charging parameters and/or for securely and simply performing the charging operation.

A cyber wallet or an e-wallet is a digital virtual wallet which is not tied to any material carrier, for example a payment card. It makes it possible for the user to manage credit on electronic platforms and to use it for payments, for example for goods and/or services. As a result of the use of cyber wallets, the electric vehicle and the power source can advantageously negotiate charging parameters with the aid of the smart contract and can securely and efficiently perform the charging operation of the electrical energy store of the electric vehicle. In other words, there is no need for the user of the vehicle to intervene. The negotiation of the charging parameters for the charging operation preferably includes capturing a charging price by means of the smart contract; and accepting the charging price by means of the electric vehicle.

For example, the fact that each power source specifies a charging price can be implemented in the smart contract as a condition. In this case, the smart contract can be set up or implemented such that the power source can set the charging price as a parameter. In this case, the smart contract can capture the charging price of the power source for can receive it in a set form from the power source and can forward it to the electric vehicle. In another example, a corresponding application or app can be set up in the vehicle to read the charging price and possibly further information from the smart contract. The electric vehicle can accept the charging price by agreeing to participate in the smart contract, for example. In principle, the capture of the charging price can be implemented in any desired manner in the smart contract and can be performed in accordance with the implementation. For example, prior negotiation of the charging price between the electric vehicle and one or more power sources can also be performed.

In addition, the negotiation of the charging parameters may comprise further aspects, for example the reservation of a time for charging the energy store at the power source, etc. The performance of the charging operation with the aid of the smart contract preferably includes blocking and managing a charging amount with the aid of the cyber wallet of the smart contract; charging the energy store according to the charging amount by means of the power source; receiving a charging confirmation at the smart contract upon completion of the charging by the power source; and releasing the blocked charging amount by means of the smart contract.

For example, the electric vehicle can determine a charging requirement of the electrical energy store, can calculate a charging amount for the charging requirement according to the charging price and can set the calculated charging amount. The charging requirement of the electrical energy store may be, for example, a charging requirement which is needed for the electric vehicle in order to reach a next destination. In another example, the charging requirement may be the charging quantity needed to fully charge the electrical energy store. In a further example, the charging requirement may be a predefinable or predefined charging variable which corresponds to a micro charging step. In this example, a multiplicity of successive micro charging steps can be implemented or performed.

The charging amount which has been set can be blocked and managed by the smart contract.

After the charging amount has been blocked by the smart contract, the energy store can be charged according to the charging amount. For example, the smart contract can ask the power source to charge the electrical energy store of the electric vehicle according to the charging amount. In another example, a corresponding application or app can be loaded and executed in the power source, which application is set up to read the blocking of the charging amount by the smart contract from the smart contract (for example at regular intervals of time) and to charge the energy store of the vehicle according to the blocked charging amount. After the charging operation has been concluded, a charging confirmation can be set and/or received at the smart contract. For example, after the charging operation has been concluded, the vehicle can set a corresponding charging confirmation parameter. Additionally or alternatively, the power source can set a corresponding charging confirmation parameter after the charging operation has been concluded. After the smart contract detects and/or receives the charging confirmation, it can end the blocking of the charging amount, with the result that the charging amount can be transferred to the cyber wallet of the power source.

If the entire charging quantity corresponding to the charging amount cannot be charged (for example fault of the power source), provision may be made for only the amount of money for the charging quantity actually provided to be released by the smart contract, whereas the remaining amount is reimbursed to the cyber wallet of the electric vehicle. Alternatively, the underlying object is achieved by means of a method for quickly and securely performing charging operations of electric vehicles comprising an electrical energy store, including negotiating the charging parameters for a charging operation of the electrical energy store of an electric vehicle between the electric vehicle and a power source; and performing the charging operation of the electrical energy store
with the aid of a smart contract.

The electric vehicle, the power source and the smart contract preferably each comprise at least one cyber wallet or e-wallet for negotiating the charging parameters and/or for securely and simply performing the charging operation. The negotiation of the charging parameters for the charging operation preferably includes capturing a charging price by means of the smart contract; and accepting the charging price by means of the electric vehicle.

The performance of the charging operation with the aid of the smart contract preferably includes blocking and managing a charging amount with the aid of the cyber wallet of the smart contract; charging the energy store according to the charging amount by means of the power source; receiving a charging confirmation at the smart contract upon completion of the charging by the power source; and releasing the blocked charging amount by means of the smart contract.

These and other objects, features and advantages of the embodiments of the present invention are illustrated from the study of the following detailed description of preferred embodiments and the accompanying figures. It is clear that—although embodiments are described separately—individual features therefrom can be combined to form additional embodiments.

Other objects, advantages and novel features of the present invention will become apparent from the following detailed description of one or more preferred embodiments when considered in conjunction with the accompanying drawings.

DETAILED DESCRIPTION OF EMBODIMENTS

Figure 1:
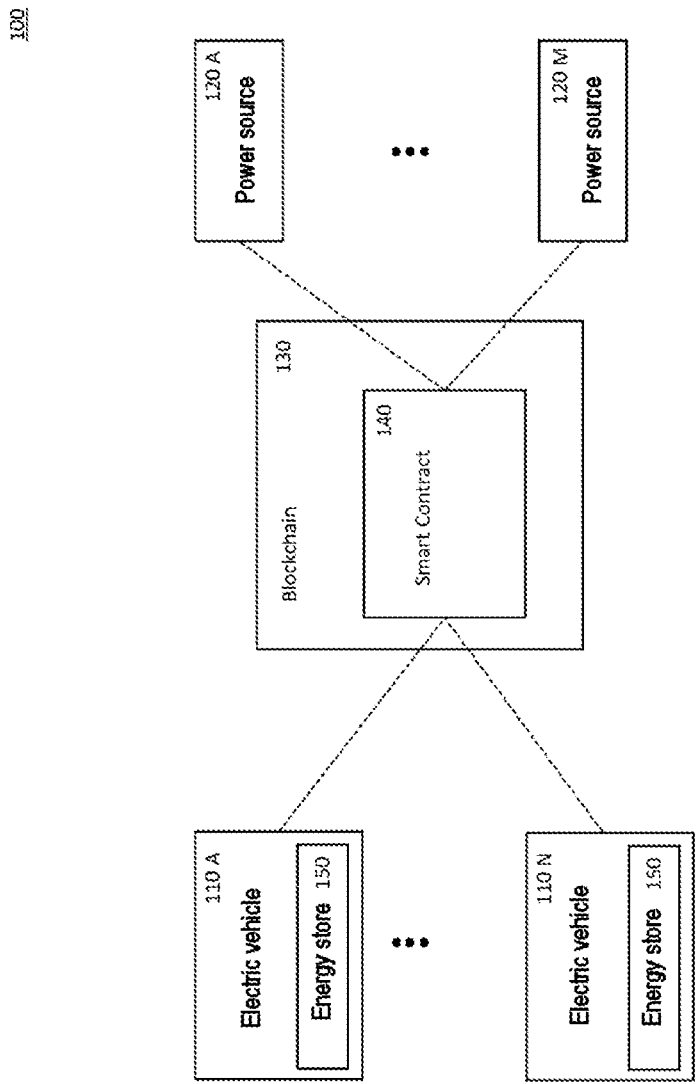
FIG. 1 shows an exemplary system for quickly and securely performing charging operations.

FIG. 1 shows an exemplary system 100 for quickly and securely performing charging operations of at least partially electrically operated vehicles 110A . . . 110N (also called electric vehicles 110A . . . 110N below). Each electric vehicle 110A . . . 110N may be, in particular, an electric automobile or a plug-in hybrid, or else any other at least partially electrically operated vehicle (for example truck, bus, bicycle, scooter, etc.). Each electric vehicle 110A . . . 110N comprises at least one electrical energy store 150. The system 100 also comprises at least one power source 120A . . . 120M. The power source 120A . . . 120M can be used to charge the electrical energy store 150 of the electric vehicle 110A . . . 110N. For example, the energy store 150 can be connected to the power source 120A . . . 120M via a suitable charging cable (for example mode 1, mode 2 or mode 3 charging cable according to IEC 62196 or DIN standard DIN EN 62196) and can be charged. Alternatively, the energy store 150 can be electromagnetically connected to the power source 120A . . . 120M for inductive charging. During inductive charging in particular, the charging current can be electromagnetically effected from one coil, which can be connected to the power source 120A . . . 120M via a power supply unit, to a further oil which can be accordingly positioned in the electric vehicle 110A . . . 110N. In this case, the electrical charging quantity to be fed in on the primary side, that is to say the power source side, can be made available as inductive reactive current to the secondary side, that is to say the electric vehicle side.

The power source 120A . . . 120M which can be used to charge the energy store 150 of the vehicle 110A . . . 110N can be any desired power source 120A . . . 120M, for example a charging pole, a conventional household socket, household wall charging stations or wall boxes, a further electric vehicle, the electrical energy store of which is charged but the electrical energy is not required (for example owner is not in the country), a streetlight, a photovoltaic store, an inductive charging station or a charging pad, etc.

The electric vehicle 110A . . . 110N and the power source 120A . . . 120M can each comprise a blockchain module (not shown, with which they can participate in a blockchain. For example, a blockchain node can be executed on the blockchain module. In another example, a light client for participating in the blockchain 130 can be executed on the blockchain module. In particular, the blockchain module can comprise a runtime environment for executing a blockchain node.

The system 100 also comprises at least one smart contract 140 which is stored in the blockchain 130 at a particular address, for example in the form of executable script. The use of the blockchain technology advantageously makes it possible to perform the charging operation in a particularly secure and forgery-proof manner.

Charging parameters for a charging operation of the electrical energy store 150 are negotiated between an electric vehicle 110A . . . 110N and a power source 120A . . . 120M with the aid of the smart contract 140. In this case, the negotiation 210 of the charging parameters for the charging operation of the electrical energy store 150 of the electric vehicle 110A . . . 110N can comprise: capturing 212 a charging price 160 by means of the smart contract 140; and accepting 214 the charging price 160 by means of the electric vehicle 110A . . . 110N.

The smart contract 140, the electric vehicle 110A . . . 110N and the power source 120A . . . 120M can each comprise at least one cyber wallet 115, 125, 145 (also called wallet 115, 125, 145 below) for negotiating 210 the charging parameters and/or for securely and easily performing 220 the charging operation of the electrical energy store 150. As a result of the use of the cyber wallets 115, 125, 145, the electric vehicle 110A . . . 110N and the power source 120A . . . 120M can advantageously negotiate charging parameters with the aid of the smart contract 140 and can securely and efficiently perform the charging operation of the electrical energy store 150 of the electric vehicle 110A . . . 110N.

For example, the fact that each power source 120A . . . 120M specifies a charging price 160, that is to say can set the charging price 160 as a parameter in the smart contract 140, can be implemented as a condition in the smart contract 140. The smart contract 140 can therefore capture the charging price 160 of the power source 120 or can receive it by transmission from the power source 120 and can forward it to the electric vehicle 110A . . . 110N. In another example, a corresponding application or app can be set up in the vehicle (loaded and executed in the electric vehicle 110A . . . 110N) to read the charging price 160 and possibly further information from the smart contract 140. The electric vehicle 110A . . . 110N can accept the charging price 160 by agreeing to participate in the smart contract, for example. In another example, the determination of the charging price 160 may comprise previous negotiation of the charging price between the electric vehicle 110A . . . 110N and one or more power sources 120A . . . 120M. In principle, the capture of the charging price can be implemented in any desired manner in the smart contract 140 and can be performed according to the implementation.

In addition, the previously negotiated charging operation of the electrical energy store 150 is simply and securely performed with the aid of the smart contract 140. The performance 220 of the charging operation with the aid of the smart contract 140 may comprise: blocking and managing 222 a charging amount with the aid of the cyber wallet 145 of the smart contract 140; charging 224 the energy store 150 according to the charging amount by means of the power source 120A . . . 120M; receiving 226 a charging confirmation at the smart contract 140; and releasing 228 the blocked charging amount by means of the smart contract 140.

For example, the electric vehicle 110A . . . 110N can determine a charging requirement of the electrical energy store 150, can calculate a charging amount for the charging requirement according to the charging price 160 and can set the calculated charging amount. The charging requirement of the electrical energy store 150 may be, for example, a charging requirement which is needed for the electric vehicle 110A ... 110N in order to reach a next destination. In another example, the charging requirement may be the charging quantity needed to fully charge the electrical energy store 150. In a further example, the charging requirement may be a predefinable or predefined charging variable which corresponds to a micro charging step. In this example, a multiplicity of successive micro charging steps may be implemented or performed.

The charging amount which has been set can be blocked and managed by the smart contract 140.

After the charging amount has been blocked by the smart contract 140, the energy store 150 can be charged according to the charging amount. For example, the smart contract 140 can ask the power source 120A ... 120M to charge the electrical energy store 150 of the electric vehicle 110A ... 110N according to the charging amount. In another example, a corresponding application or app can be loaded and executed by a suitable module of the power source 120A ... 120M, which application is set up to read the blocking of the charging amount by the smart contract 140 from the smart contract 140 (for example at regular intervals of time, etc.). After the charging operation has been concluded, a charging confirmation can be set and/or received at the smart contract 140. For example, after the charging operation has been concluded, the vehicle 110A ... 110N can set a corresponding charging confirmation parameter. Additionally or alternatively, the power source 120A ... 120M can set a corresponding charging confirmation parameter after the charging operation has concluded. After the smart contract 140 detects and/or receives the at least one charging confirmation, it can release the blocking of the charging amount, with the result that the charging amount can be transferred to the cyber wallet 125 of the power source 120A ... 120M.

If the entire charging quantity corresponding to the charging amount cannot be charged (for example fault of the power source 120A ... 120M), provision may be made for only the amount of money for the charging quantity actually provided to be released by the smart contract 140, whereas the remaining amount is reimbursed to the cyber wallet 115 of the electric vehicle 110A ... 110N.

This advantageously provides a charging system which can automatically negotiate charging parameters and can perform charging operations of electrical energy stores in a simple manner using machine-to-machine (M2M) communication, in which case the need for prior complicated registrations with the various providers of charging stations in order to carry out the charging and payment operations is dispensed with.

Figure 2:
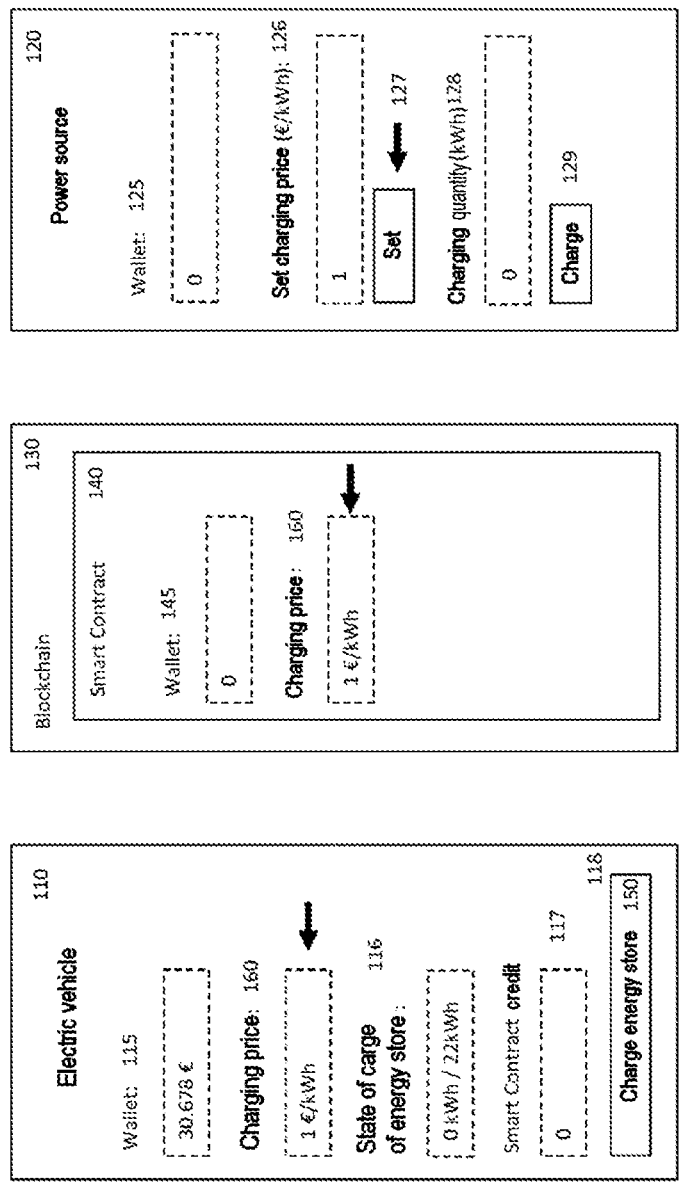
FIG. 2 shows exemplary steps which are performed when negotiating the charging parameters for a charging operation.
Figure 3:
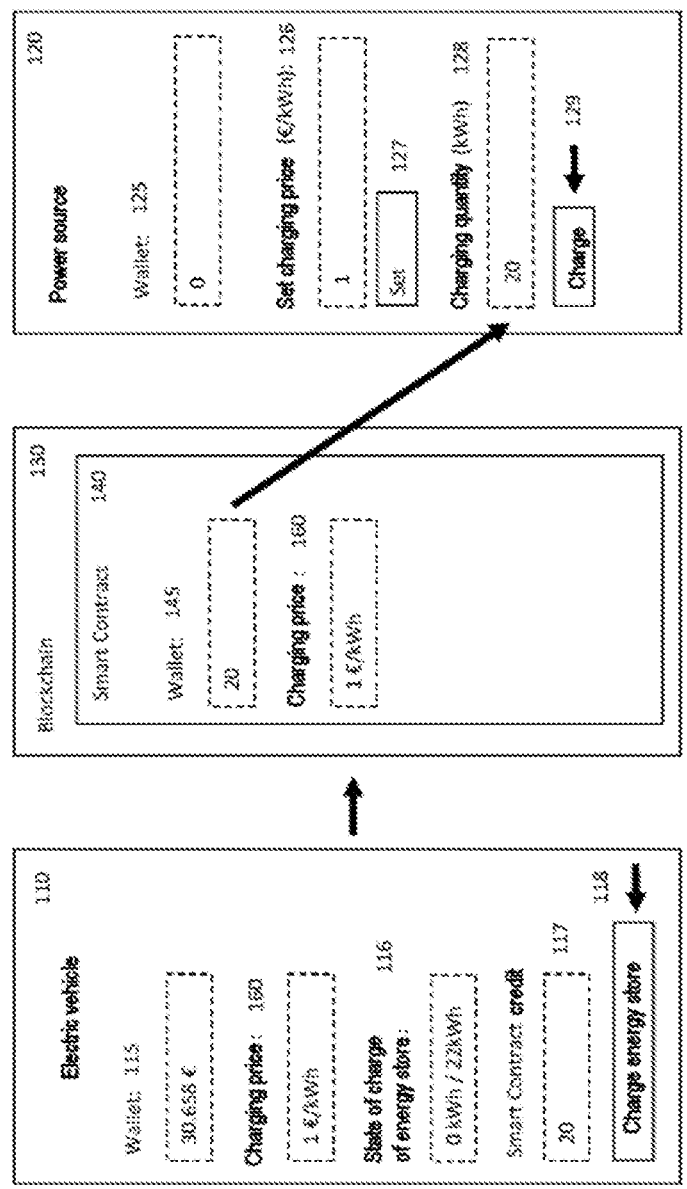
FIG. 3 shows exemplary steps which are performed when carrying out the charging operation.
Figure 4:
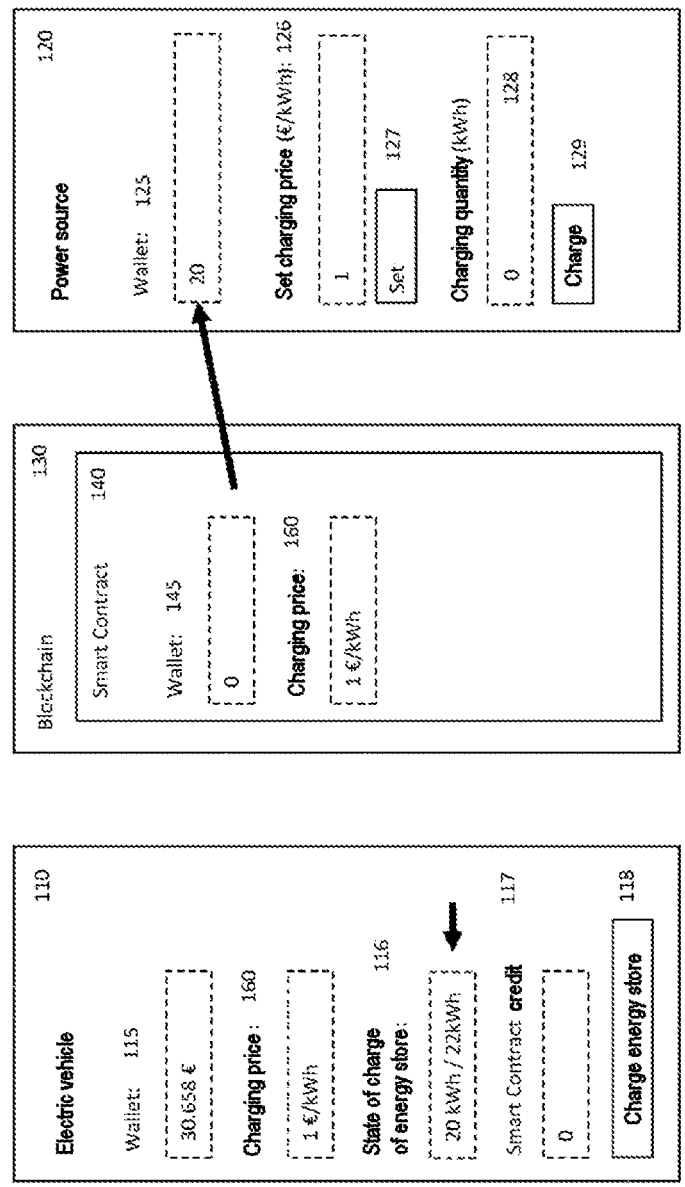
FIG. 4 shows exemplary steps which are performed in order to terminate the charging operation.

FIGS. 2 to 4 show, using an example, the steps which can be performed when negotiating 210 the charging parameters for a charging operation and when performing 220 and terminating the charging operation. These steps are merely an exemplary implementation of some aspects shown with respect to FIG. 1.

FIG. 2 indicates, for example, how the charging price can be captured 212 by the smart contract 140. In this example, it is possible for the power source 120 to set the charging price 126 as a parameter in the smart contract 140. In this example, an authorization which authorizes the power source 120 to set the charging price 126 can be stored in the smart contract 140. For example, the charging price 126 can be set in euro (€)/kilowatt hour (kWh).

The currency actually used is irrelevant. In another example, the smart contract can be implemented using Ethereum. Ethereum is a distributed system which provides a platform for implementing smart contracts and is based on its own public blockchain. In this case, the charging price 126 can be set in the corresponding cryptocurrency Ether/kWh, for example.

After the charging price 160 has been set by the power source 120, it is available to the smart contract 140. The charging price 160 can now be captured by the vehicle 110. For example, the charging price 160 can be forwarded to the vehicle 110 by the smart contract 140. In another example, an app can be loaded and executed in the vehicle 110, which app is set up to read the charging price 160 and possibly further information from the smart contract.

FIG. 3 shows exemplary steps which can be carried out when accepting 214 the charging price 160 and when performing 220 the charging operation. In a next step 214, the electric vehicle 110 can accept the charging price by agreeing to participate in the smart contract 140 or in a charging operation with the aid of the smart contract 140. In this example, the electric vehicle 110 determines a charging requirement 128 or an electrical charging quantity 128 to be fed into the energy store 150 and calculates a charging amount corresponding to the charging price 160 (charging requirement x charging price 160). For example, the charging requirement parameter 128 can be read from a suitable module 116 (state of charge of the energy store 116) in the electric vehicle 110. In this example, the state of charge of the energy store is 0 kWh of at most 22 kWh and the vehicle determines a charging requirement of 20 kWh, for example because this state of charge of the energy store 150 is needed to cover a next planned route. The electric vehicle 110 calculates the charging amount for the charging requirement according to the charging price 160 of the power source 120; the charging amount is 20 € at 1€/kWh. This charging amount can be blocked from the cyber wallet 115 of the vehicle 110 by the cyber wallet 125 of the smart contract 140. After the charging amount has been blocked by the smart contract 140, the charging operation can be initiated as explained with respect to FIG. 1.

FIG. 4 shows exemplary steps which can be performed when terminating the charging operation. For example, after the charging quantity has been fed in (state of charge of the energy store corresponds to the charging quantity), the vehicle 110 can transmit a charging confirmation to the smart contract 140 or can set said charging confirmation. Additionally or alternatively, the charging confirmation can also be effected by the power source 120 (cf. FIG. 1). Following the charging confirmation from the electric vehicle 110 and/or the power source 120, the smart contract 140 can cancel or release the blockade of the charging amount, with the result that the charging amount can be transferred to the cyber wallet 125 of the power source 120A ... 120M.

If the entire charging quantity corresponding to the charging amount cannot be charged (for example fault of the power source 120), provision may be made for only the amount of money for the charging quantity actually provided to be released by the smart contract 140, whereas the remaining amount is reimbursed to the cyber wallet 115 of the electric vehicle 110.

Figure 5:
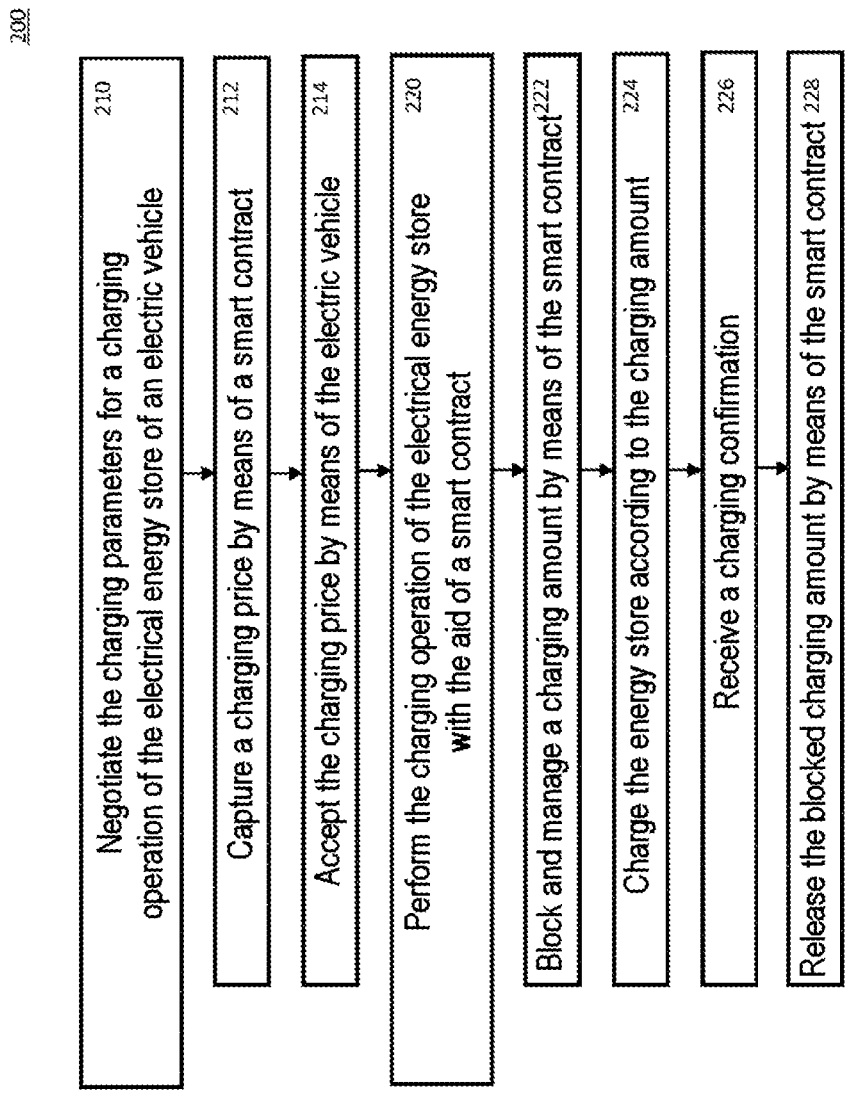
FIG. 5 shows an exemplary method for quickly and securely performing charging operations.

FIG. 5 shows an exemplary method 200 for quickly and securely performing charging operations of electrical energy stores 150 of electric vehicles 110A ... 110N. The method 200 can be implemented as explained with respect to FIG. 1 and can comprise the exemplary steps explained with respect to FIGS. 2 to 4.

The method 200 comprises negotiating 210 the charging parameters for a charging operation between the electric vehicle 110A . . . 110N and a power source 120A . . . 120M with the aid of a smart contract 140. The negotiation 210 of the charging parameters for the charging operation can comprise the following steps: capturing 212 a charging price 160 by means of the smart contract 140; accepting 214 the charging price 160 by means of the electric vehicle 110A . . . 110N.

The method also comprises performing 220 the charging operation of the electrical energy store 150 with the aid of the smart contract 140. The performance 220 of the charging operation with the aid of the smart contract 140 may comprise in this case: blocking and managing 222 a charging amount with the aid of the cyber wallet 145 of the smart contract 40; charging 224 the energy store 150 according to the charging amount by means of the power source 120A . . . 120M; receiving 226 a charging confirmation at the smart contract 140 upon completion of the charging by the power source 120A . . . 120M; and releasing 228 the blocked charging amount by means of the smart contract 140.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging system for quickly and securely performing charging operations of electric vehicles, comprising:
    at least one electric vehicle comprising at least one electrical energy store;
    at least one power source which is configured to charge the energy store according to a charging amount;
    and at least one smart contract, wherein
        the charging parameters for a charging operation of the electrical energy store are negotiable between the electric vehicle and the power source,
        the negotiation of the charging parameters comprises determining a charging requirement of the electrical energy store by means of the electric vehicle; and
    the charging operation of the electrical energy store is performable with the aid of a smart contract, wherein
        the smart contract comprises at least one cyber wallet,
        the cyber wallet blocks and manages the charging amount,
        the smart contract receives a charging confirmation upon completion of the charging by the power source, and
        the smart contract releases the blocked charging amount.

2. The charging system according to claim 1, wherein the electric vehicle, the power source, and the smart contract each comprise at least one cyber wallet configured to negotiate the charging parameters and configured to securely and simply perform the charging operation.

3. The charging system according to claim 2, wherein the negotiation of the charging parameters for the charging operation comprises:
    capturing a charging price by means of the smart contract; and
    accepting the charging price by means of the electric vehicle.

4. A method for quickly and securely performing charging operations of electric vehicles, comprising:
    negotiating the charging parameters for a charging operation of the electrical energy store of an electric vehicle between the electric vehicle and a power source, wherein the negotiation of the charging parameters comprises determining a charging requirement of the electrical energy store by means of the electric vehicle; and
    performing the charging operation of the electrical energy store with the aid of a smart contract, wherein
    the smart contract comprises at least one cyber wallet;
    the performance of the charging operation with the aid of the smart contract comprises:
        blocking and managing a charging amount with the aid of the cyber wallet of the smart contract;
        charging the energy store according to the charging amount by means of the power source;
        receiving a charging confirmation at the smart contract upon completion of the charging by the power source; and
        releasing the blocked charging amount by means of the smart contract.

5. The method according to claim 4, wherein the electric vehicle, the power source and the smart contract each comprise at least one cyber wallet for negotiating the charging parameters and for securely and simply performing the charging operation.

6. The method according to claim 5, wherein the negotiation of the charging parameters for the charging operation comprises:
    capturing a charging price by means of the smart contract; and
    accepting the charging price by means of the electric vehicle.

* * * * *